(12) United States Patent
Parson

(10) Patent No.: US 8,359,329 B2
(45) Date of Patent: Jan. 22, 2013

(54) METHOD, COMPUTER APPARATUS AND COMPUTER PROGRAM FOR IDENTIFYING UNUSUAL COMBINATIONS OF VALUES IN DATA

(75) Inventor: Rupert Parson, London (GB)

(73) Assignee: Future Route Limited, London (GB)

( * ) Notice: Subject to any disclaimer, the term of this patent is extended or adjusted under 35 U.S.C. 154(b) by 225 days.

(21) Appl. No.: 12/527,168

(22) PCT Filed: Feb. 7, 2008

(86) PCT No.: PCT/GB2008/000449
§ 371 (c)(1),
(2), (4) Date: Nov. 9, 2009

(87) PCT Pub. No.: WO2008/099143
PCT Pub. Date: Aug. 21, 2008

(65) Prior Publication Data
US 2010/0088306 A1    Apr. 8, 2010

Related U.S. Application Data

(60) Provisional application No. 60/889,696, filed on Feb. 13, 2007.

(51) Int. Cl.
*G06F 7/00* (2006.01)
*G06F 17/30* (2006.01)

(52) U.S. Cl. ..................................... 707/776
(58) Field of Classification Search ............... 707/691, 707/776, 690, 801
See application file for complete search history.

(56) References Cited

U.S. PATENT DOCUMENTS

| 6,553,359 | B1 * | 4/2003 | Schwenkreis .................... 706/46 |
| 7,571,159 | B2 * | 8/2009 | Thomas et al. ........................ 1/1 |
| 2003/0078686 | A1 * | 4/2003 | Ma et al. .......................... 700/91 |
| 2004/0215457 | A1 * | 10/2004 | Meyer ............................ 704/251 |
| 2006/0184500 | A1 * | 8/2006 | Najork et al. ..................... 707/1 |

FOREIGN PATENT DOCUMENTS

WO    WO2008099142    8/2008

OTHER PUBLICATIONS

Wu et al. "Efficient Mining of Both Positive and Negative Association Rules." ACM Transactions on Information Systems [online], vol. 22, No. 3, Jul. 2004 [retrieved on Sep. 21, 2011]. Retrieved from the Internet <URL: http://dl.acm.org/citation.cfm?id=1010616> pp. 381-405.*

Yun et al. "Mining association rules on significant rare data using relative support" Journal of Systems and Software [online], vol. 67, Issue 3, Sep. 15, 2003 [retrieved on Sep. 21, 2011]. Retrieved from the Internet <URL: http://www.sciencedirect.com/science/article/pii/S0164121202001280> pp. 181-191.*

Jaillet et al. "Sequential patterns for text categorization" Intelligent Data Analysis, vol. 10., Issue 3, May 2006 [retrieved on Sep. 21, 2011], Retrieved from the Internet <URL: http://hal-lirmm.ccsd.cnrs.fr/docs/00/13/50/10/PDF/ida245.PDF> 16 Pages.*

(Continued)

*Primary Examiner* — James E Richardson
(74) *Attorney, Agent, or Firm* — Conley Rose, P.C.

(57) ABSTRACT

In a method of identifying unusual combinations of values in data (1) that is arranged in rows and columns, the data is pre-processed to put it into a form (4, 5) suitable for application of a search method thereto. Using said search method, the pre-processed data is searched (8) to search the set of possible combinations of unique values from the columns to find any combinations that are unusual according to an evaluation metric.

21 Claims, 4 Drawing Sheets

OTHER PUBLICATIONS

Kang et al. "mBAR: A Materialized Bitmap Based Association Rule Algorithm" Proceedings of the 21st International Conference on Data Engineering. Apr. 2005 [retrieved on Sep. 21, 2011], Retrieved from the Internet <URL: http://ieeexplore.ieee.org/stamp/stamp.jsp?tp=&arnumber=1647838> 5 pages.*

Holst et al. "Abnormality Detection in Event Data and Condition Counters on Regina Trains" Nov. 2006, in Railway Condition Monitoring, 2006. The Institution of Engineering and Technology International Conference on. pp. 53-56.*

International Search Report and Written Opinion for PCT/GB2008/000449, dated Sep. 12, 2008 (11 pages).

Omiecinski, Edward R.; Alternative Interest Measures for Mining Associations in Databases, IEEE Transaction on Knowledge andData Engineering, vol. 15, No. 1 Jan./Feb. 2003, pp. 57-69 (14 pages).

Szathmary, L., Chapter 5, Rare Itemsets and Rare Association Rules, Methodes Symboliques De Fouille de Donnees Avec La Plate-Forme Coron, Nov. 24, 2006, XP-002504545 (46 pages).

Burdick, D., et al., MAFIA: A Maximal Frequent Itemset Algorithm, IEEE Transactions on Knowledge and Date Engineering, vol. 17, No. 11, Nov. 2005, pp. 1490-1504, XP-002504542 (16 pages).

Goethals, B., et al., FIMI'03: Workshope on Frequent Itemset Mining Implementations, Proceedings of the 2003 Workshop on Frequent Itemset Mining Implementations (FIMI'03), Nov. 19, 2003, XP002504541 (14 pages).

* cited by examiner

| Age | Gender | Height | Marital status | Religion |
|---|---|---|---|---|
| 38 | Male | 133 | Husband | Protestant |
| 62 | Female | 145 | Single | Anglican |
| 42 | Male | 169 | Single | Catholic |
| 36 | Male | 135 | Single | Islam |
| 20 | Male | 184 | Husband | Islam |
| 32 | Female | 126 | Single | n/a |
| 76 | Female | 133 | Single | Atheist |
| 50 | Male | 158 | Husband | Catholic |
| 20 | Female | 117 | Husband | Protestant |
| 24 | Female | 134 | Single | Atheist |
| 50 | Female | 143 | Single | Catholic |
| 74 | Male | 186 | Single | Protestant |
| 59 | Male | 171 | Husband | Anglican |
| 22 | Female | 132 | Wife | Anglican |
| 60 | Female | 103 | Wife | Catholic |
| 42 | Male | 176 | Single | Islam |
| 34 | Male | 137 | Single | Atheist |
| 51 | Male | 152 | Single | Anglican |
| 58 | Male | 159 | Single | Islam |
| 36 | Female | 127 | Wife | Islam |
| 58 | Female | 129 | Wife | Protestant |
| 27 | Female | 102 | Single | Anglican |
| 42 | Male | 149 | Husband | Atheist |
| 68 | Female | 103 | Single | Atheist |
| 55 | Male | 164 | Husband | n/a |
| 45 | Female | 123 | Wife | n/a |
| 53 | Female | 117 | Single | Protestant |
| 63 | Male | 179 | Single | Anglican |
| 27 | Male | 181 | Single | Catholic |
| 57 | Female | 133 | Single | n/a |
| 62 | Male | 168 | Single | Anglican |

Fig. 3

| Age | Gender | Height ↓ | Marital status | Religion |
|---|---|---|---|---|
| start | start | start | start | start |
| no item | no item | no item | no item | no item |
| 1 | Female | 102 | Husband ← | Anglican |
| 22 | Male ← | 103 | Single | Atheist |
| 24 | | 117 | Wife | Catholic |
| 27 | | 123 | | Islam ← |
| 32 | | 126 | | n/a |
| 34 ← | | 127 | | Protestant |
| 36 | | 129 ← | | |
| 38 | | 132 | | |
| 42 | | 133 | | |
| 45 | | 134 | | |
| 50 | | 135 | | |
| 51 | | 137 | | |
| 53 | | 143 | | |
| 55 | | 146 | | |
| 57 | | 149 | | |
| 58 | | 152 | | |
| 59 | | 158 | | |
| 60 | | 159 | | |
| 62 | | 164 | | |
| 63 | | 168 | | |
| 68 | | 169 | | |
| 74 | | 171 | | |
| 76 | | 176 | | |
| | | 179 | | |
| | | 181 | | |
| | | 184 | | |
| | | 186 | | |

Fig. 4

METHOD, COMPUTER APPARATUS AND COMPUTER PROGRAM FOR IDENTIFYING UNUSUAL COMBINATIONS OF VALUES IN DATA

CROSS-REFERENCE TO RELATED APPLICATIONS

The present application claims the benefit of priority to PCT/GB2008/000449 filed 7 Feb. 2008, which is hereby incorporated herein by reference in its entirety for all purposes, and claims the benefit of priority to U.S. Provisional Application No. 60/889,696, filed 13 Feb. 2007, which is also incorporated herein by reference in its entirety for all purposes.

STATEMENT REGARDING FEDERALLY SPONSORED RESEARCH OR DEVELOPMENT

Not applicable.

FIELD OF THE INVENTION

The present invention relates to a method, computer apparatus and a computer program for identifying unusual combinations of values in data.

BACKGROUND OF THE INVENTION

Enterprises are increasingly using rule-based systems in order to manage many and various aspects of their businesses. Rule-based systems have been used in a multitude of applications, including: detecting credit card fraud, data quality, lending and credit approval, insurance, securities and capital markets trading cycle, manufacturing operations, telecommunications, logistics, transportation and travel, government, and retail.

Typically, in the prior art, the rules that are used in these systems are created manually through a defined process of analysis, construction and approval cycle by a group of (human) domain experts. Such manual rule generation, testing, and maintenance can be a challenging proposition. Such rules: require deep (human) domain expertise in addition to specialised skills in data processing; require long lead times to set up; are difficult to maintain in a consistent and clean manner; are inherently focused on prescribing behaviour by replicating past trends as observed in specific instances, making them less able to capture new trends and requiring constant maintenance; and are generated over a period of time with input from different human experts, creating inconsistencies and reducing accuracy.

Rule-based systems are widely used in the domain of data quality, including in the identification of anomalies in data. It is becoming increasingly important to monitor and improve data quality. Many corporations and other organisations have invested large sums in building numerous data warehouses to support their information needs. Availability of information and efficiency of reporting have been the key driver in their implementation. However, in order to derive more value, it is necessary that more attention is paid to the quality of the data that they contain. In addition, the regulatory requirements of for example Basel II and Sarbanes-Oxley are demanding improvements in data quality. For instance, Basel II requires the collection and maintenance of over 180 fields from multiple source systems. In order to comply, it will be obligatory to follow the principles enforced by controlled definition and measurement. Furthermore, the risk inherent in data quality will have to be continually measured, controlled and aligned with business value.

Typical data quality systems require a library of business and data compliance rules, which are used to measure and monitor the quality of data. The rules in these systems are created and maintained by human analysts, often requiring the assistance of expensive consultants. Because of the underlying complexity of the problem being addressed, the human-created rules suffer from inaccuracy in that they do not identify all data quality issues completely accurately. In addition, they quickly become out of date as the underlying business evolves, as it is not possible for human intervention to manually track the content and form of the underlying data, in the same way that it is not possible for humans to manually record and store the sort of volumes of data that are stored in large-scale modern databases.

It is becoming increasingly necessary, therefore, that the rules used in data quality systems are created and maintained automatically by a technical solution.

SUMMARY OF THE PRESENT INVENTION

According to a first aspect of the present invention, there is provided a method of identifying unusual combinations of values in data that is arranged in rows and columns, the method comprising:

pre-processing the data to put it into a form suitable for application of a search method thereto; and, using said search method, searching through the pre-processed data to search the set of possible combinations of unique values from the columns to find any combinations that are unusual according to an evaluation metric.

The preferred embodiments of the present invention eliminate and/or reduce the problems of the essentially manual processes of the prior art and provide an automatic process which discovers unusual combinations. In the preferred embodiments, these unusual combinations are converted into logic language rules. In automating the process, the preferred embodiments do not merely automate a process that was carried out manually in the past. The prior art process suffers from the deterioration of the rule set described above, and the rule sets created by hand are not optimal given the data. Preferred embodiments of the present invention represent a technological advance because the rule sets, which in a practical embodiment are created using software that analyses the computer data, offer a higher degree of accuracy combined with a lower false positive rate than achievable by human rule creation. Further, the volume of data that in practice is required to be analysed exceeds the feasibility of human intervention, and the exhaustive search process carried out by the preferred rule-creation methods exceeds the technical ability of human experts. Indeed, the preferred embodiments of the present invention rely on having large amounts of data in order to achieve high accuracy. These large amounts of data make the problem intractable if carried out manually as in the prior art.

In a preferred embodiment, the pre-processing comprises creating, for each unique value found in each column, a bitset representation that indicates occurrences of that unique value in that column. A bitset is an array of bits that can be efficiently manipulated by a set of logical of operations and therefore provides a particularly convenient mechanism for representing the data in the present context.

In a preferred embodiment, the searching uses a table of unique column-value pointers incremented in a recursive manner to find unusual combinations.

In one embodiment, the evaluation metric is based on infrequency of the combined unique values from the columns when compared to the frequency of the individual values from the columns.

In another embodiment, the evaluation metric is based on the excess bits of information provided by the combined unique values from the columns when compared to the sum of the bits of information provided by the individual values from the columns.

In yet another embodiment, the evaluation metric is based on the excess bits of information provided by the combined unique values from the columns when compared to the sum of the bits of information provided by the individual values from the columns, scaled to take into account the randomness of the underlying columns being considered.

These different bases for the evaluation metrics provide different advantages and one may be better suited than another depending on a number of factors, as discussed further below.

In a preferred embodiment, to limit the range of the search, the searching uses pruning to prevent values from the columns being searched in the case that none of said values in a row matches the combined unique vales from the columns being considered.

In a preferred embodiment, to limit the range of the search, the searching uses pruning to prevent values from the columns being searched based on the number of rows that match the combined unique values from the columns being considered and on the evaluation metric being used.

Such pruning of the data can greatly reduce the amount of work, and therefore in a practical embodiment, the amount of processing time and/or demands on processor complexity, to identify unusual values in the data.

In an embodiment, the search determines that a combination is unusual when its score according to the evaluation metric exceeds a threshold.

The threshold may be manually set by a user.

Alternatively, the threshold is automatically set by being derived automatically from the data. A qualitative input may be given by a user as to how significantly unusual a unique value from the columns combination must be to be determined to be unusual.

In an embodiment, the method comprises converting an unusual combination of unique values from the columns into a logic language rule.

According to a second aspect of the present invention, there is provided computer apparatus for identifying unusual combinations of values in rows in data that is arranged in rows and columns, the computer apparatus comprising:

a data pre-processing engine arranged to pre-process said data to put it into a form suitable for application of a search engine thereto; and, a search engine arranged to search the pre-processed date to search through the set of possible combinations of unique values from the columns to find any combinations that are unusual according to an evaluation metric.

BRIEF DESCRIPTION OF THE DRAWINGS

Embodiments of the present invention will now be described by way of example with reference to the accompanying drawings, in which:

FIG. 3 shows an example of an unusual combination in data identified by an embodiment of the present invention; and, FIG. 4 shows schematically the use of pointers in a search of an embodiment of the present invention.

DETAILED DESCRIPTION OF THE PREFERRED EMBODIMENTS

Figure 1:
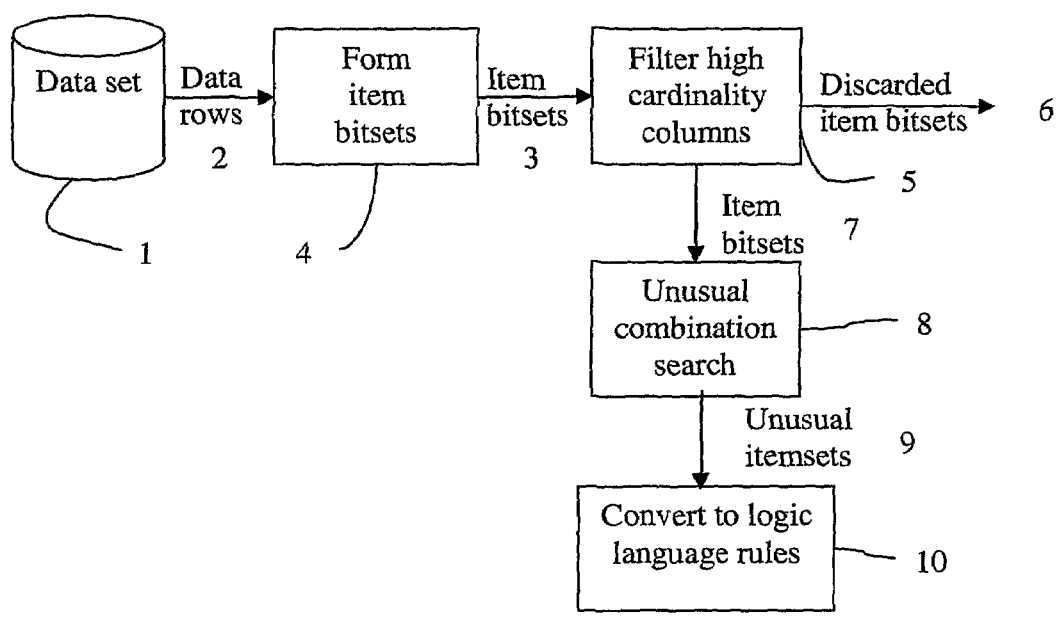
FIG. 1 shows schematically an overview of an example of a method according to an embodiment of the present invention.

Embodiments of the present invention will now be described by way of example.

A non-limiting description of several terms used herein will first be given to aid the understanding of the present invention. The descriptions given here also relate each of the terms to a running example throughout: a data set generated from a census questionnaire from a sample of the population.

Column

A column in a data set is a vertical array of values, all of which are of the same type and described by the same heading. The size of a column, which is the number of entries in the vertical array, is equal to the number of records in the data set. In the census data set example, a column might be the answers to a particular question, such as ethnicity, given by all of the respondents. There will be as many entries in the column as there were respondents, and therefore records (completed census forms).

Row

A row in a data set is a horizontal array comprising one value from each column in the data set. The size of a row, which is the number of entries in the horizontal array, is equal to the number of columns in the data set. A row may sometimes be referred to as a record. A row in the census data set example would correspond to all of the entries on a completed census form for one individual respondent.

It will be understood that, given that in general the data will in practice be stored in computer memory or other storage devices, "column" and "row", and correspondingly "vertical" and "horizontal", are used herein largely metaphorically and by analogy, as is conventional in the art, and shall be construed accordingly.

Value

A value is the data element contained in a specific column of a row, or equivalently, a specific row of a column. In the census data set, this might correspond to a value entered into a box by a respondent, such as their age. A value can be one of two kinds:

Discrete Values: a discrete value is chosen from a specified set of possibilities. Two discrete values cannot be compared for anything other than equality. In the census data set, ethnicity is a discrete value.

Continuous Values: a continuous value is a numerical value to which standard arithmetic can be applied. Two continuous values can be compared with the usual mathematical comparison operators, such as "greater than", "less than", "equal to". In the census data set, the respondent's weight or height would be a continuous value.

The set of unique values found in a column is called a column value set.

Column Cardinality

The cardinality of a column is the number of unique or distinct values that occur in it, or equivalently, the size of its column value set. For instance, a column containing only two different distinct values (such as "Yes" and "No") has a cardinality of two.

"High cardinality" columns are columns with many distinct values. Each value in a high cardinality column is less frequent on average than values in a low cardinality column.

"Low cardinality" columns are columns with few distinct values. Each value in a low cardinality column is more frequent on average than values in a high cardinality column.

Itemsets

A specific value in a specific column is also known as a column value, or more simply, an item. An item is therefore a pair consisting of a column, coupled with a value found in that column. A row can therefore be considered as an array of items.

An itemset is a set of items, each for a distinct column. It is therefore a generalised row in which only a subset of the column values are specified. The other column values are unspecified, and can match any value in the dataset. An itemset's column set is the set of columns for which the items specify values. Note that a single item is effectively an itemset consisting of only one specified column value. If X is an itemset, then the individual items within X are denoted $x_1$, $x_2$, $x_3$ . . . .

"Itemset coverage" is the number of rows in the data set that match (are covered by) the itemset pattern, i.e. have the same item values in the subset of columns that are specified in the itemset. This is denoted cov(X).

A "frequent itemset" is an itemset that has a high coverage in a data set. In other words, it represents a pattern occurring frequently in the rows of data.

A "relatively infrequent itemset" is an itemset for which the individual items in the itemset each occur frequently in the dataset, but rarely do they occur all together on the same row. The existence of an infrequent itemset usually indicates a quality problem in the data.

Mathematics

The Shannon information of an event that occurs with probability x is defined to be $-\log_2(x)$. This function returns a higher value when x is an infrequent event than when x is frequent. It can thus be seen as measuring the "degree of surprise" for a column value. It measures the number of bits of information that is imparted by the event x occurring. The entropy of a column $c_i$ in the dataset is then defined to be:

$$\text{Entropy}(c_i) = -\text{sum}(x \log_2(x))$$

where x is the probability of each of the possible values that the column's entries take.

Data Structures

Bitset: a bitset is an array of bits (0s and 1s). Bitsets can be efficiently manipulated by a set of logical operations. They are used in the preferred embodiments described herein as a way of representing the occurrences of a discrete value in a column in the data set. Each discrete value found in a particular column is represented by one bitset, called an item bitset. The bitset will have a 1 or a 0 in each location in its array depending on whether the item's value appears or does not appear, respectively, at that location in the item's column.

Map: a map is a data structure that maintains associations between instances of objects, such as item and bitset. Each entry in an "item-to-bitset" map would link a particular item to a particular bitset. Given a particular item, it is possible to look up and retrieve its associated bitset from the map.

Example Method

There will now be described an example of an embodiment of the present invention that is used to identify or detect inconsistent items within a data set. The present example can be regarded as proceeding in two main stages:

1. pre-process the data set to:
   (a) assess column cardinalities,
   (b) build item bitsets, and
   (c) select columns for analysis; and
2. analyse the item bitsets to:
   (a) search for unusual combinations, and
   (b) sort, and return the most unusual combinations 1. Pre-Processing the Data Set Prior to loading the data, maps corresponding to the columns of the data (one map per column) are created so that a link can be retained between unique values in each column (i.e. items) and the corresponding item bitsets.

A maximum cardinality threshold is selected in advance, in this example this being set manually by a user. Since values from high cardinality columns are less likely on average to be constituents of an infrequent itemset as mentioned above, maps corresponding to columns that exceed a user-set cardinality threshold are removed while data is read in. This is typically the case for columns containing continuous values.

The pre-processing stage of the present example then proceeds as follows:

1. Data is read in from the data set sequentially one row at a time:
   (a) each row is traversed item by item;
   (b) if an item is encountered that has not been met before:
      (i) the cardinality count for the column is incremented. If it has exceeded the maximum cardinality threshold, the map and the bitsets for corresponding column are removed from memory; otherwise:
      (ii) a mapping between the new item and a new bitset is created in the column's map;
   (c) the item's bitset is updated by setting (to 1) the bit with the same index as the current row number;
   (d) repeat for each item in the current row.
2. These operations are performed for every row until the entire data set has been processed.
3. Summarise the set of unique items found in each column into a table of items for each column. These are the set of items that may be looked up in each column's map. Throw away any column that has exceeded the cardinality threshold.

The above steps are shown schematically in FIG. 1, which shows a data set 1 from which data rows 2 are read. Item bitsets 3 are formed 4 from the data rows 2. High cardinality columns are filtered 5 and corresponding item bitsets discarded 6 as described above. The other item bitsets are retained 7 for analysis as discussed further below.

2. Search

The search 8 employs a breadth-first search method searching the search space of possible item combinations.

The search 8 uses the entries in the table of unique items per column generated in the pre-processing stage. A new "virtual" item is added to the start of each list of items for each column. This virtual item corresponds to "no item", the absence of an item for that column. A respective pointer for each column's list of items indicates which item is currently being considered for that column.

The search is undertaken using a pointer over the columns themselves. The pointer indicates which column's item selection is currently being modified. The search method tries all the combinations of items, choosing one from each column's item list (including the "no item" virtual items). The search is structured in such a way as to allow optimal pruning of the search space, i.e. the (early) removal of itemsets from being searched, which speeds the search process.

The search starts with all the columns' item pointers pointing to a "start" position before the "no item" item in each column's item list and with the column pointer pointing at the second column from the right.

Figure 2:
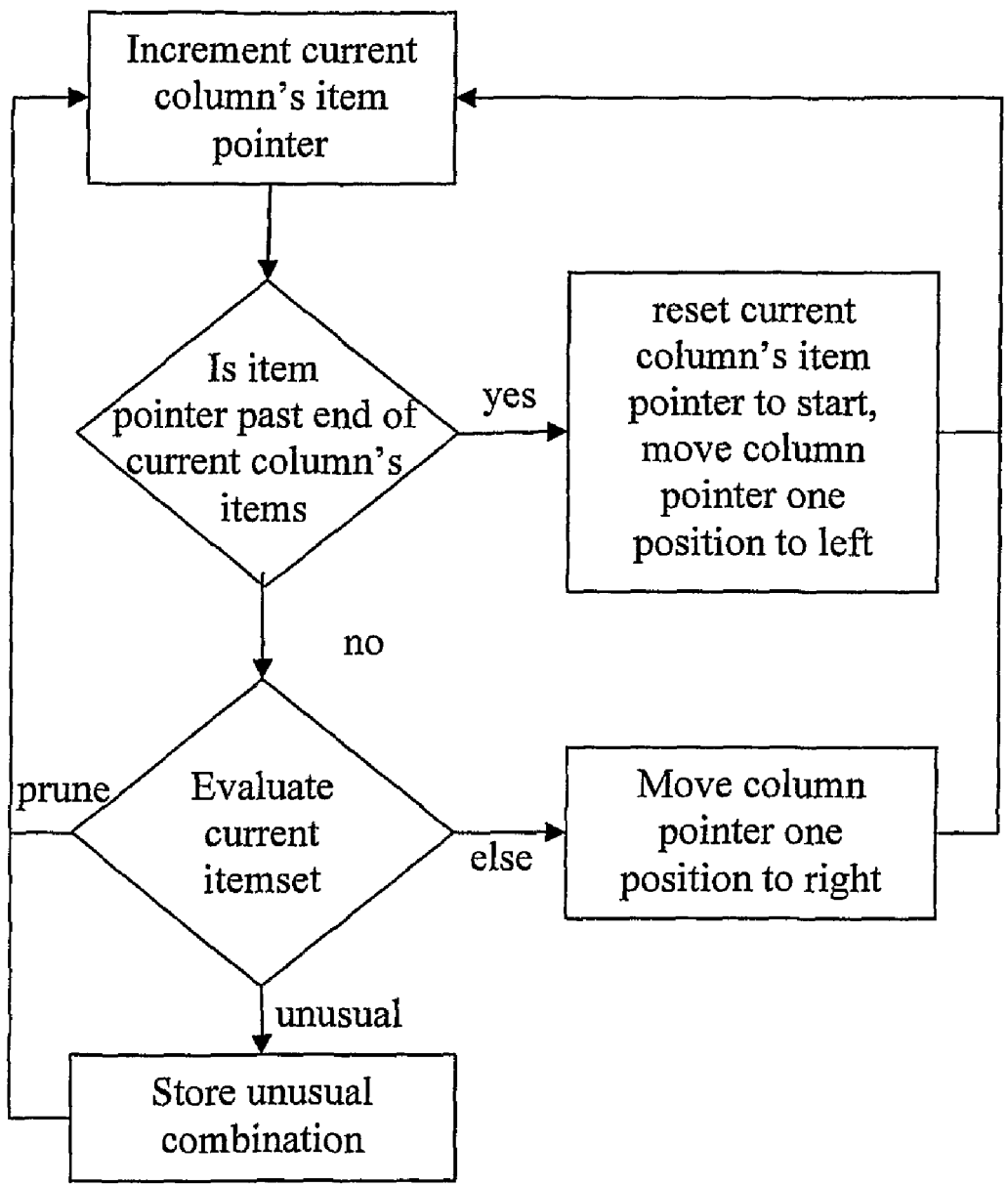
FIG. 2 shows schematically an overview of an example of a search method used in an embodiment of the present invention.

Referring to FIG. 2, the search proceeds as follows:
1. move forward one place the item pointer of the column indicated by the column pointer;
2. if the current column's item pointer is past the end of the item list:
   (a) reset the item pointer back up to before the start "no item",
   (b) move the column pointer one position to the left,
   (c) go to 1.
3. else, evaluate the itemset specified by all the column item pointers (see next section). Depending on the result:
   (a) if the itemset is evaluated as an unusual combination, store it, then go to 1.
   (b) if the itemset is evaluated as suitable to be pruned, then go straight back to 1,
   (c) else move the column pointer one place to the right, and then go to 1.

Evaluating Itemsets

At each stage of the search, the current set of selected items in each column item list is combined to form an itemset. The associated bitset for each item in each column is combined using a logical AND to form a coverage bitset for the itemset as a whole. This coverage bitset is then used to compute the coverage of the combined itemset.

The combined itemset is evaluated to determine one of three outcomes:
1. the itemset is an unusual combination 9, and is output,
2. the itemset and all its derivatives cannot be unusual, and should therefore be pruned from the search, or
3. the itemset could potentially have unusual derivations, so the search should be continued.

Three examples methods of this evaluation procedure will now be discussed. These consist of three separate formulae, called evaluation metrics, for providing a value measure indicating how unusual is the itemset being evaluated.

A threshold $\theta$ determines whether each itemset is so unusual as to be recorded. In one preferred embodiment of the present example, this threshold is manually provided. In an alternative embodiment, the threshold is computed automatically. An example of how to compute the threshold automatically is given below.

In each case, given an evaluation formula, further analysis will determine whether an itemset should be pruned.

In the following formulae, X denotes an itemset; $x_1, x_2, x_3, \ldots$ denote X's individual constituent items, and $x_i$ denotes them all; coverage(X) denotes an itemset's coverage in the dataset, and D is the size (i.e. number of rows) of the data set itself.

Given a threshold $\theta$, in each of the cases below, an itemset being tested will be evaluated as unusual if the value of the evaluation metric exceeds $\theta$.

1. Relative Frequency:

$$\text{RelativeFrequency}(X) = \min(\text{cov}(x_i))/\text{cov}(X)$$

This measures the infrequency of an itemset's coverage relative to the smallest coverage of its constituent items. Any candidate itemsets that are infrequent when compared to their individual constituents will be identified by this formula.

It should be noted that this infrequency value changes greatly from dataset to dataset, which makes it difficult to set a default threshold value. The following alternative methods, in which information measures are used, give a more stable estimate.

2. Excess Bits:

$$\text{ExcessBits}(X) = -\log_2(\text{cov}(X)/D)/\text{sum}(-\log_2(\text{cov}(x_i)/D))$$

This formula measures the number of excess bits in an itemset as a ratio. The excess bits measure can be interpreted as "the amount of extra information contained in an itemset compared to the sum of the information of its constituents". The advantage of this approach compared to relative frequency is that an infrequent itemset will generate an excess bits value that is significantly higher than that of a more frequent combination, which makes the discrimination of unusual items clearer.

This method does not, however, take the underlying properties of the columns that the items are taken from into consideration. The final formula addresses this problem.

3. Scaled Excess Bits:

$$\text{ExcessBitsScaled}(X) = (-\log_2(\text{cov}(X)/D) - \text{sum}(-\log_2(\text{cov}(x_i)/D)))/\text{estimate}(\text{Average Column Entropy in itemset})$$

where:

$$\text{estimate}(\text{Average Column Entropy in itemset}) = (\max(\text{Entropy}(c_i)) + \text{sum}(\text{Entropy}(c_i)))/2$$

This formula scales the excess bits by an approximated average information content of the columns from which the items were taken. It has the appealing property that it takes the underlying information content of the columns from which the items are taken into consideration when measuring the degree of infrequency, which ensures that variations due to patterns in column entropy do not lead to itemsets being incorrectly identified as unusual.

Using the census data set example given above, FIG. 3 shows how a particular combination (here "female" and "husband") has been identified as an unusual combination. FIG. 4 shows an item combination search table, illustrating the column pointer and each column's item-pointer as discussed above for the census data set example.

Pruning

At each stage of the search for unusual itemsets, a determination can be made as to whether it is worthwhile continuing the search from that point or whether instead the search should backtrack and try a different potential combined set of items. This strategy can greatly reduce the amount of work required to identify unusual itemsets, thus improving the overall performance of the present method.

A number of possibilities are available, including:

Empty Itemset:

If the coverage of an itemset is at any time evaluated to be 0 then there is no row of data in the dataset that matches the pattern of items. This means that the itemset, and any derivative of it, cannot appear in the data and should therefore be pruned.

Dependent on a Predefined Threshold:

For each of the evaluation metrics described in the previous section, and given a predefined threshold, it may be possible to determine a level of itemset coverage below which it is not worth continuing the search and at which the itemset search should therefore be pruned. Examples of an implementation of this for each of the evaluation metrics discussed above are given below.

1. Relative Frequency:

For the relative frequency evaluation metric, once the following holds:

$$\min(\text{coverage}(x_i)) < \theta$$

it is then impossible for the given itemset, or any derivation of it, to be evaluated as unusual and it should therefore be pruned.

2. Excess Bits:

For the excess bits evaluation metric, once the following holds:

$$\text{sum}(-\log_2(\text{cov}(x_i)/D)) > -\log_2(1/D)/\theta$$

it is then impossible for the given itemset, or any derivation of it, to be evaluated as unusual and it should therefore be pruned.

3. Excess Bits Scaled

For the excess bits-scaled metric, once the following holds:

$$\text{sum}(-\log_2(\text{cov}(x_i)/D)) > -\log_2(1/D) - \theta \cdot \text{estimate}(\text{max column entropy in dataset})$$

where:

$$\text{estimate}(\text{max column entropy in dataset}) = (\text{max}(\text{Entropy}(c_i)) + \text{sum}(\text{Entropy}(c_i))/2 \text{ over all columns } c_i$$

it is then impossible for the given itemset, or any derivation of it, to be evaluated as unusual and it should therefore be pruned.

Automatic Identification of the Unusual-Value Threshold

In the above described embodiment, the method determines on-the-fly whether each itemset being evaluated exceeds a threshold that is manually set. Unfortunately this requires human input in the form of a manually input value for the threshold.

A preferred embodiment includes a process by which the threshold is identified or set automatically during the search. An example of how to achieve this is as follows:

The standard search is run, as described above. During this search, only the "empty itemset" pruning mechanism is used; the other, threshold-dependent pruning methods are not used. The threshold itself is ignored. All itemsets generated during the search process are stored in a "heap" data structure of a restricted size H so that the H itemsets with the greatest scores according to the evaluation metric are preserved.

Once the space has been searched completely, the threshold is then computed based on the highest score S achieved by all the itemsets evaluated in the search. In one example, the threshold can be set in one of three ways, depending on the preference of the user and whether the user wishes to identify significantly unusual, unusual, or slightly unusual itemsets:

any itemset with score greater than S/2 is identified as significantly unusual;

otherwise, any itemset with score greater than S/3 is identified as unusual;

otherwise, any itemset with score greater than S/4 is identified as slightly unusual.

It will be understood that the values given here for dividing the highest score S are examples only and that other values, which rise relative to each other, may be used.

Conversion of Itemsets to Logic Language Rules

An itemset is a collection of items, which in turn consist of a column coupled with a specific value for that column. This object can be simply transformed 10 into a logic language rule that describes the unusual combination and can be used to identify those rows in the data that are unusual.

Suppose there is an itemset $I = \{(c_1, v_1), (c_2, v_2), \ldots (c_n, v_n)\}$, where the $c_i$ denote columns, and the $v_i$ denote values. In one example, this is transformed into the logic language rule:

unusual (Row): – value (Row, $c_1$, $v_1$), value (Row, $c_2$, $v_2$),

... , value (Row, $c_n$, $v_n$).

This rule can be interpreted, and indeed can be automatically translated in the obvious manner, into the following English statement:

a row denoted by Row is unusual if the value in column $c_1$ of Row is $v_1$, and the value in column $c_2$ of Row is $v_2$, and

... , the value in column $c_n$ of Row is $v_n$.

The rule can be output to the user of the system in this English statement form to aid the understanding of the unusual combination of values found by the method.

The statement can also be output in the logic language rule shown above into a file on a computer storage medium for later retrieval into a logic language execution system such as Prolog. The logic language execution system can then execute the rule against a data set in order to identify those rows in the data that exhibit the unusual combination of values described by the rule.

The data that may be handled by embodiments of the present invention may in general be any type of data. Nevertheless, the preferred embodiments of the present invention have particular application with data that conventionally has been sampled, owing for example to the volume of data which historically has made it infeasible to manually analyse all of the data. The data may be for example financial accounting data provided from an accounts software application used by a user.

It will be understood that the term "computer" as used herein is to be construed broadly. The term "a computer" may include several distributed discrete computing devices or components thereof. Although the embodiments of the present invention described herein comprise computer processes performed in computer apparatus and computer apparatus itself, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes. Many of the processing steps may be carried out using software, dedicated hardware (such as ASICs), or a combination.

Embodiments of the present invention have been described with particular reference to the examples illustrated. However, it will be appreciated that variations and modifications may be made to the examples described within the scope of the present invention.

The invention claimed is:

1. A method of identifying unusual combinations of values in data that is arranged in plural rows and plural columns, wherein each column of a row contains a value, the method comprising:
   pre-processing the data to put it into a form suitable for application of a search method thereto, comprising creating a table of unique column-values, including a "no item" value for each column;
   using said search method, searching through the pre-processed data to search the set of possible combinations of unique values from the columns by recursively incrementing unique column-value pointers in the table and for each set of values selected by said pointers, evaluating the set of values according to an evaluation metric to determine one of:
      the set of unique values is an unusual combination;
      the set of unique values cannot be unusual; and
      the set of unique values could potentially have unusual derivatives;
   outputting the set of unique values if it is determined that the set of unique values is an unusual combination;
   pruning the set of unique values and all its derivatives from the search if it is determined that the set of unique values cannot be unusual; and
   continuing the search if it is determined that the set of unique values could potentially have unusual derivatives;
   wherein the evaluation metric is based on excess bits of information provided by bits of information of the combined set of unique values from the columns when compared to the sum of bits of information provided by the individual values from the columns scaled to take into account the randomness of the underlying columns being considered, wherein said bits of information are determined in accordance with the logarithm of the probability of the combined set of unique values or the individual values in the data.

2. A method according to claim 1, wherein the pre-processing comprises:
   creating, for each unique value found in each column, a bitset representation that indicates occurrences of that unique value in that column.

3. A method according to claim 1, wherein the evaluation metric is based on infrequency of the combined unique values from the columns when compared to the frequency of the individual values from the columns.

4. A method according to claim 1, wherein, to limit the range of the search, the searching uses pruning to prevent values from the columns being searched in the case that none of said values in a row matches the combined unique values from the columns being considered.

5. A method according to claim 1, wherein, to limit the range of the search, the searching uses pruning to prevent values from the columns being searched based on the number of rows that match the combined unique values from the columns being considered and on the evaluation metric being used.

6. A method according to claim 1, wherein, the search determines that a combination is unusual when its score according to the evaluation metric exceeds a threshold.

7. A method according to claim 6, wherein the threshold is manually set by a user.

8. A method according to claim 6, wherein the threshold is automatically set by being derived automatically from the data.

9. A method according to claim 8, wherein a qualitative input is given by a user as to how significantly unusual a unique value from the columns combination must be to be determined to be unusual.

10. A method according to claim 1, comprising converting an unusual combination of unique values from the columns into a logic language rule.

11. A computer apparatus for identifying unusual combinations of values in data that is arranged in plural rows and plural columns, wherein each column of a row contains a value, the computer apparatus comprising:
   a data pre-processing engine including a hardware processor or dedicated hardware arranged to pre-process said data to put it into a form suitable for application of a search engine thereto, comprising creating a table of unique column-values, including a "no item" value for each column; and,
   a search engine including a hardware processor or dedicated hardware arranged to search the pre-processed data to search through the set of possible combinations of unique values from the columns by recursively incrementing unique column-value pointers in the table and for each set of values selected by said pointers, evaluating the set of values according to an evaluation metric to determine one of:
      the set of unique values is an unusual combination;
      the set of unique values cannot be unusual; and
      the set of unique values could potentially have unusual derivatives
   wherein the search engine is further configured to:
      output the set of unique values if it is determined that the set of unique values is an unusual combination;
      prune the set of unique values and all its derivatives from the search if it is determined that the set of unique values cannot be unusual; and
      continue the search if it is determined that the set of unique values could potentially have unusual derivatives; and
   wherein the search engine is arranged to use an evaluation metric that is based on excess bits of information provided by bits of information of the combined set of unique values from the columns when compared to the sum of bits of information provided by the individual values from the columns scaled to take into account the randomness of the underlying columns being considered, wherein said bits of information are determined in accordance with the logarithm of the probability of the combined set of unique values or the individual values in the data.

12. An apparatus according to claim 11, wherein the pre-processing engine is arranged to create, for each unique value found in each column, a bitset representation that indicates occurrences of that unique value in that column.

13. An apparatus according to claim 12, wherein, the search engine is arranged to determine that a combination is unusual when its score according to the evaluation metric exceeds a threshold.

14. An apparatus according to claim 13, wherein the search engine is arranged to receive a user-input to set said threshold manually.

15. An apparatus according to claim 13, wherein the search engine is arranged to set said threshold automatically by deriving said threshold automatically from the data.

16. An apparatus according to claim 15, wherein the search engine is arranged to receive a qualitative input given by a user as to how significantly unusual a unique value from the columns combination must be to be determined to be unusual.

17. An apparatus according to claim 11, wherein the search engine is arranged to use an evaluation metric that is based on infrequency of the combined unique values from the columns when compared to the frequency of the individual values from the columns.

18. An apparatus according to claim 11, wherein, to limit the range of the search, the search engine is arranged to use pruning to prevent values from the columns being searched in the case that none of said values in a row matches the combined unique values from the columns being considered.

19. An apparatus according to claim 11, wherein, to limit the range of the search, the search engine is arranged to use pruning to prevent values from the columns being searched based on the number of rows that match the combined unique values from the columns being considered and on the evaluation metric being used.

20. An apparatus according to claim 11, wherein the search engine is arranged to output an unusual combination of unique values from the columns as a logic language rule.

21. A computer program, recorded on a non-transitory computer readable storage medium, containing program instructions for causing a computer to carry out a method of identifying unusual combinations of values in data that is arranged in plural rows and plural columns, wherein each column of a row contains a value, the method comprising:

pre-processing the data to put it into a form suitable for application of a search method thereto, comprising creating a table of unique column-values, including a "no item" value for each column;

using said search method, searching through the pre-processed data to search the set of possible combinations of unique values from the columns by recursively incrementing unique column-value pointers in the table and for each set of values selected by said pointers, evaluating the set of values according to an evaluation metric to determine one of:

the set of unique values is an unusual combination;

the set of unique values cannot be unusual; and the set of unique values could potentially have unusual derivatives;

outputting the set of unique values if it is determined that the set of unique values is an unusual combination;

pruning the set of unique values and all its derivatives from the search if it is determined that the set of unique values cannot be unusual; and continuing the search if it is determined that the set of unique values could potentially have unusual derivatives;

wherein the evaluation metric is based on excess bits of information provided by bits of information of the combined set of unique values from the columns when compared to the sum of bits of information provided by the individual values from the columns scaled to take into account the randomness of the underlying columns being considered, wherein said bits of information are determined in accordance with the logarithm of the probability of the combined set of unique values or the individual values in the data.

\* \* \* \* \*